United States Patent
Matsushita et al.

(10) Patent No.: US 8,485,942 B2
(45) Date of Patent: Jul. 16, 2013

(54) VEHICLE CONTROL SYSTEM AND VEHICLE CONTROL METHOD

(75) Inventors: Koki Matsushita, Susono (JP); Shin Noumura, Susono (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 13/580,834

(22) PCT Filed: Feb. 25, 2010

(86) PCT No.: PCT/JP2010/052994
§ 371 (c)(1),
(2), (4) Date: Aug. 23, 2012

(87) PCT Pub. No.: WO2011/104852
PCT Pub. Date: Sep. 1, 2011

(65) Prior Publication Data
US 2012/0316032 A1 Dec. 13, 2012

(51) Int. Cl.
*F16H 59/48* (2006.01)
(52) U.S. Cl.
USPC .......................................... 477/120; 477/123
(58) Field of Classification Search
USPC ......................................... 477/115, 120–123
See application file for complete search history.

(56) References Cited

U.S. PATENT DOCUMENTS

| | | | |
|---|---|---|---|
| 5,662,549 A * | 9/1997 | Kondo et al. | 477/122 |
| 6,080,083 A | 6/2000 | Nishino | |
| 7,367,922 B2 * | 5/2008 | Gueter | 477/115 |
| 7,530,923 B2 * | 5/2009 | Saito et al. | 477/122 |

FOREIGN PATENT DOCUMENTS

| | | |
|---|---|---|
| JP | 63 25342 | 2/1988 |
| JP | 7 174221 | 7/1995 |
| JP | 2000 2328 | 1/2000 |
| JP | 2000 54876 | 2/2000 |
| JP | 2002 327838 | 11/2002 |
| JP | 2006 46552 | 2/2006 |

OTHER PUBLICATIONS

International Search Reprot Issued Mar. 23, 2010 in PCT/JP10/52994 Filed Feb. 25, 2010.

* cited by examiner

*Primary Examiner* — Justin Holmes
(74) *Attorney, Agent, or Firm* — Oblon, Spivak, McClelland, Maier & Neustadt, L.L.P.

(57) ABSTRACT

An engine and an automatic transmission are controlled by any one of automatic gear shift control that controls the engine based on a target engine torque based on a target driving force based on an accelerator open degree and a vehicle speed of a vehicle and controls a gear shift of the automatic transmission based on a gear shift instruction determined based on the target driving force, and manual gear shift control that controls a gear shift of the automatic transmission based on a gear shift instruction in response to an operation of a gear shift operation device performed by a driver as well as controls the engine based on the target engine torque which is determined based on the accelerator open degree and the vehicle speed so that a change of acceleration by the gear shift becomes larger than that at the time of automatic gear shift control.

6 Claims, 6 Drawing Sheets

VEHICLE CONTROL SYSTEM AND VEHICLE CONTROL METHOD

FIELD

The present invention relates to a vehicle control system and a vehicle control method.

BACKGROUND

As shown in, for example, Patent Literature 1, in recent vehicle controls, so-called torque demand control is performed which determines target acceleration that is acceleration requested by a driver based on a vehicle speed of a vehicle and an accelerator operation amount (an accelerator open degree, a depression force, and the like), when the driver operates an accelerator pedal and controls a throttle open degree, a fuel injection amount, an ignition timing, and the like of a power source, for example, an engine based on the determined target acceleration. In vehicle control systems for performing the torque demand control, not only a power source is controlled based on a target acceleration and a target driving force that are request values corresponding to acceleration generated in a vehicle but also even an automatic transmission is controlled based on the request values to achieve acceleration corresponding to the request values. Also in the vehicle control systems for performing the torque demand control as described above, as shown in Patent Literature 2, not only automatic gear shift control for causing an automatic transmission to automatically shift a gear stage but also manual gear shift control for causing the automatic transmission to shift a gear stage manually by an operation of a driver can be performed.

CITATION LIST

Patent Literature

Patent Literature 1: Japanese Patent Application Laid-open No. S63-025342

Patent Literature 2: Japanese Patent Application Laid-open No. 2006-046552

SUMMARY

Technical Problem

An object of the torque demand control is to achieve an accelerating feeling which is determined by an accelerator operation of a driver and requested by the driver regardless of a present gear shift stage. In contrast, in manual gear shift control, an automatic transmission is caused to shift a gear stage by an intention of a driver for the purpose of obtaining an accelerating feeling which is different in each of gear shift stages and corresponds to an accelerator operation of the driver. That is, the manual gear shift control is a request of the driver who desires to improve controllability of a vehicle by causing an automatic transmission to shift a gear stage manually. Accordingly, at the time of manual gear shift control, when the same acceleration as that at the time of automatic gear shift control is generated to a vehicle in the torque demand control, there is a possibility that the acceleration does not satisfy a request of the driver.

Further, when a driving force which acts on the vehicle in the automatic gear shift control is different from a driving force which acts on the vehicle in the manual gear shift control at the time the automatic gear shift control and the manual gear shift control are switched, a shock is generated when the automatic gear shift control and the manual gear shift control are switched, and thus there is a possibility that an uncomfortable feeling is applied to the driver.

Accordingly, an object of the present invention, which was made in view of the circumstances, is to provide a vehicle control system and a vehicle control method capable of performing at least any one of an improvement of controllability of a vehicle at the time of manual gear shift control or a suppression of an uncomfortable feeling to a driver.

Solution to Problem

In order to solve the above mentioned problem and achieve the object, a vehicle control system according to the present invention includes a power source coupled with drive wheels of a vehicle and controlled based on a control amount; an automatic transmission disposed between the power source and the drive wheels and a gear shift of which is controlled based on a gear shift instruction; a gear shift operation device configured to instruct a gear shift in response to an operation of a driver; a vehicle control device configured to perform any control of automatic gear shift control that controls the power source and the automatic transmission, respectively based on the control amount which is determined based on a request value corresponding to acceleration determined based on an accelerator operation amount in response to an accelerator operation performed by the driver and a vehicle speed and based on the gear shift instruction, and manual gear shift control that controls the automatic transmission based on the gear shift instruction from the gear shift operation device as well as controls the power source based on the control amount which is determined based on the accelerator operation amount and the vehicle speed so that a change of acceleration generated to the vehicle by the gear shift becomes larger than that at the time of automatic gear shift control; and a control switching instructing device configured to instruct to switch control between the automatic gear shift control and the manual gear shift control in response to an operation of the driver, wherein after the control switching instruction is issued, the vehicle control device changes a switching operation that actually switches the control in response to the accelerator operation, and the switching operation includes changing the control amount from a pre-switching control amount which is the control amount at the time of control before the control is switched to a post-switching control amount which is the control amount at the time of control after the control is switched, and the control amount is changed more gently when the accelerator is turned on than when the accelerator is turned off.

In the vehicle control system, it is preferable that the switching operation when the accelerator is turned on is performed while the accelerator operation amount changes.

In the vehicle control system, it is preferable that when the accelerator is turned off at the time it is instructed to switch the control, the switching operation makes the control amount to the post-switching control amount just after it is instructed to switch the control.

In the vehicle control system, it is preferable that when a gear shift of the automatic transmission is performed at the time the accelerator is turned on, the switching operation makes the control amount to the post-switching control amount just after the gear shift.

Further, in the present invention, a vehicle control method of controlling a power source and an automatic transmission by any of automatic gear shift control that controls the power source coupled with drive wheels of a vehicle based on a control amount which is determined based on a request value corresponding to acceleration determined based on an accelerator operation amount in response to an accelerator operation performed by a driver and based on a vehicle speed of the vehicle and controls a gear shift of the automatic transmission disposed between the power source and the drive wheels based on a gear shift instruction determined based on the request value, and manual gear shift control that controls a gear shift of the automatic transmission based on the gear shift instruction from the gear shift operation device which instructs a gear shift to the automatic transmission in response to an operation of the driver as well as controls the power source based on the control amount which is determined based on the accelerator operation amount and the vehicle speed so that a change of acceleration generated to the vehicle by the gear shift becomes larger than that at the time of automatic gear shift control, wherein after it is instructed to switch control between the automatic gear shift control and the manual gear shift control based on an operation of the driver, a switching operation that actually switches the control is changed in response to the accelerator operation, and the switching operation includes changing the control amount from a pre-switching control amount which is the control amount at the time of control before the control is switched to a post-switching control amount which is the control amount at the time of control after the control is switched, and the control amount is changed more gently when the accelerator is turned on than when the accelerator is turned off.

Advantageous Effects of Invention

In a vehicle control system and a vehicle control method according to the present invention, since a control amount is determined so that a change of acceleration generated to a vehicle by a gear shift of an automatic transmission becomes larger at the time of manual gear shift control than at the time of automatic gear shift control and a power source is controlled based on the determined the control amount, controllability of the vehicle at the time of manual gear shift control can be improved. Further, after a control switching instruction is issued, a switching operation for actually switching control can be changed in response to an operation of an accelerator and the control amount can be changed based on the operation of the accelerator by a driver, it can be suppressed that an uncomfortable feeling is applied to the driver.

DESCRIPTION OF EMBODIMENT

The present invention will be explained below in detail referring to drawings. Note that the present invention is not limited by the embodiment. Further, components in the embodiment include components that can be easily conceived by a person skilled in the art or substantially same components. Further, acceleration in the embodiment includes not only acceleration in a direction when the vehicle is accelerated but also acceleration in a direction where the vehicle is decelerated.

Figure 1:
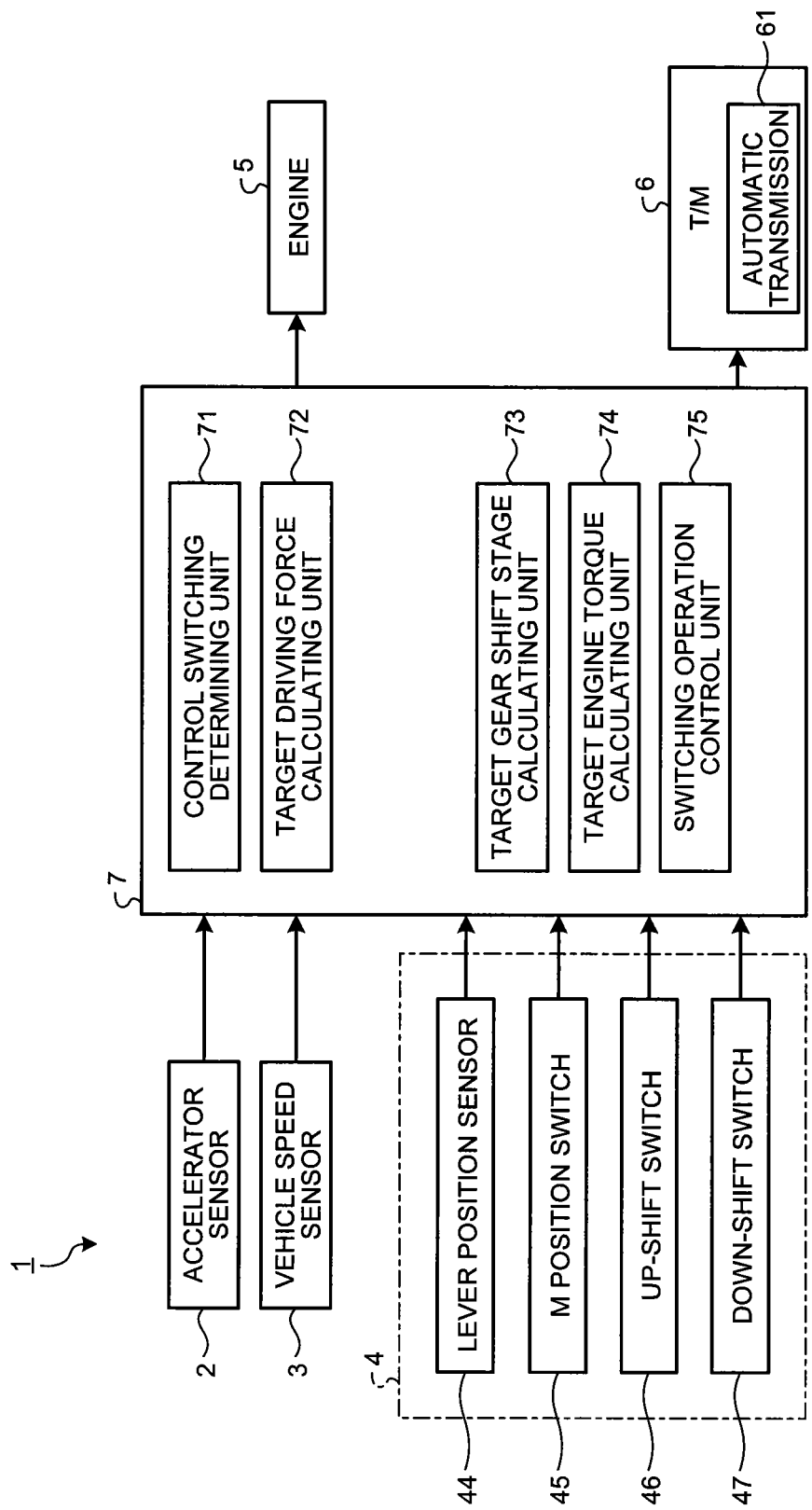
FIG. 1 is a view illustrating an example of a schematic configuration of a vehicle control system according to an embodiment.
Figure 2:
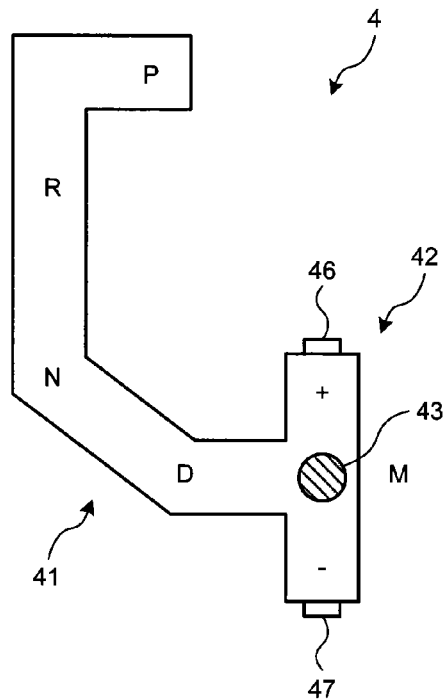
FIG. 2 is a view illustrating an example of a schematic configuration of a shift device.
Figure 3:
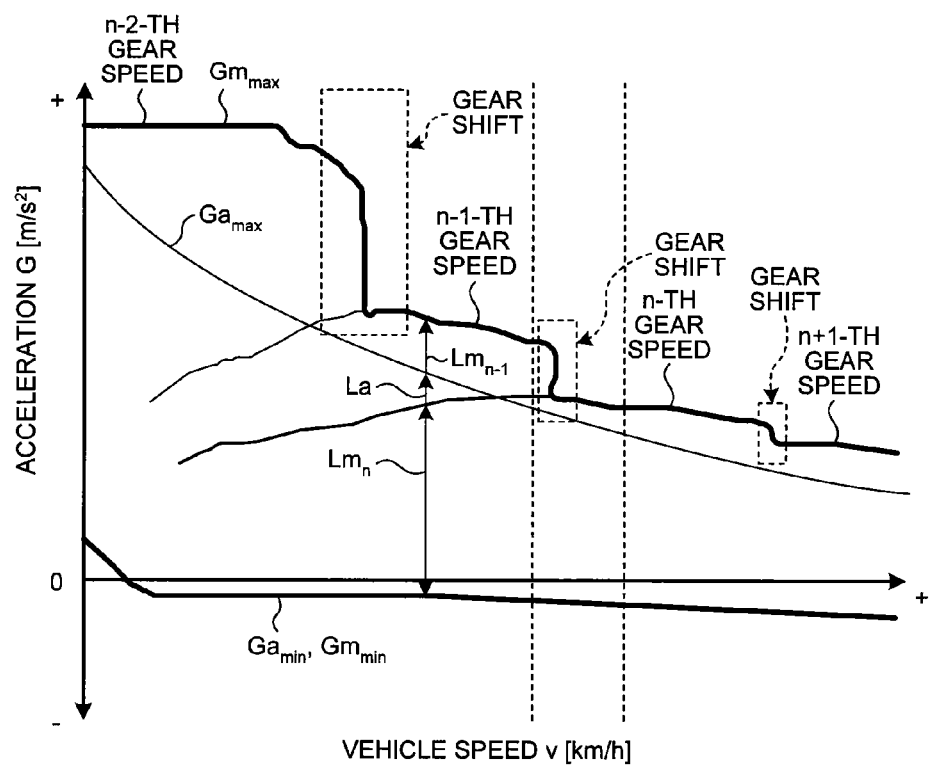
FIG. 3 is a view illustrating a relation between a vehicle speed and acceleration.
Figure 4:
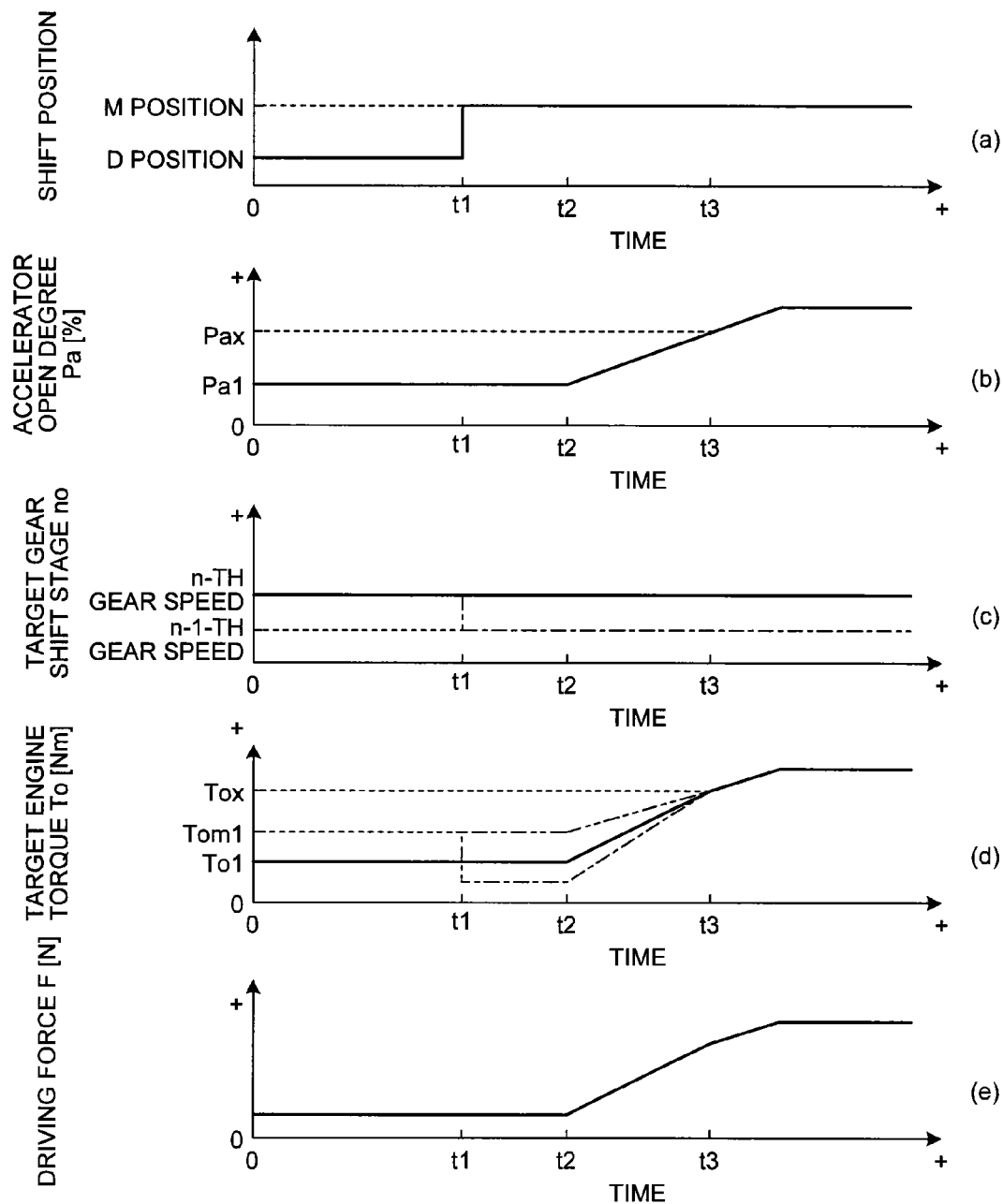
FIG. 4 is an explanatory view of an operation.
Figure 5:
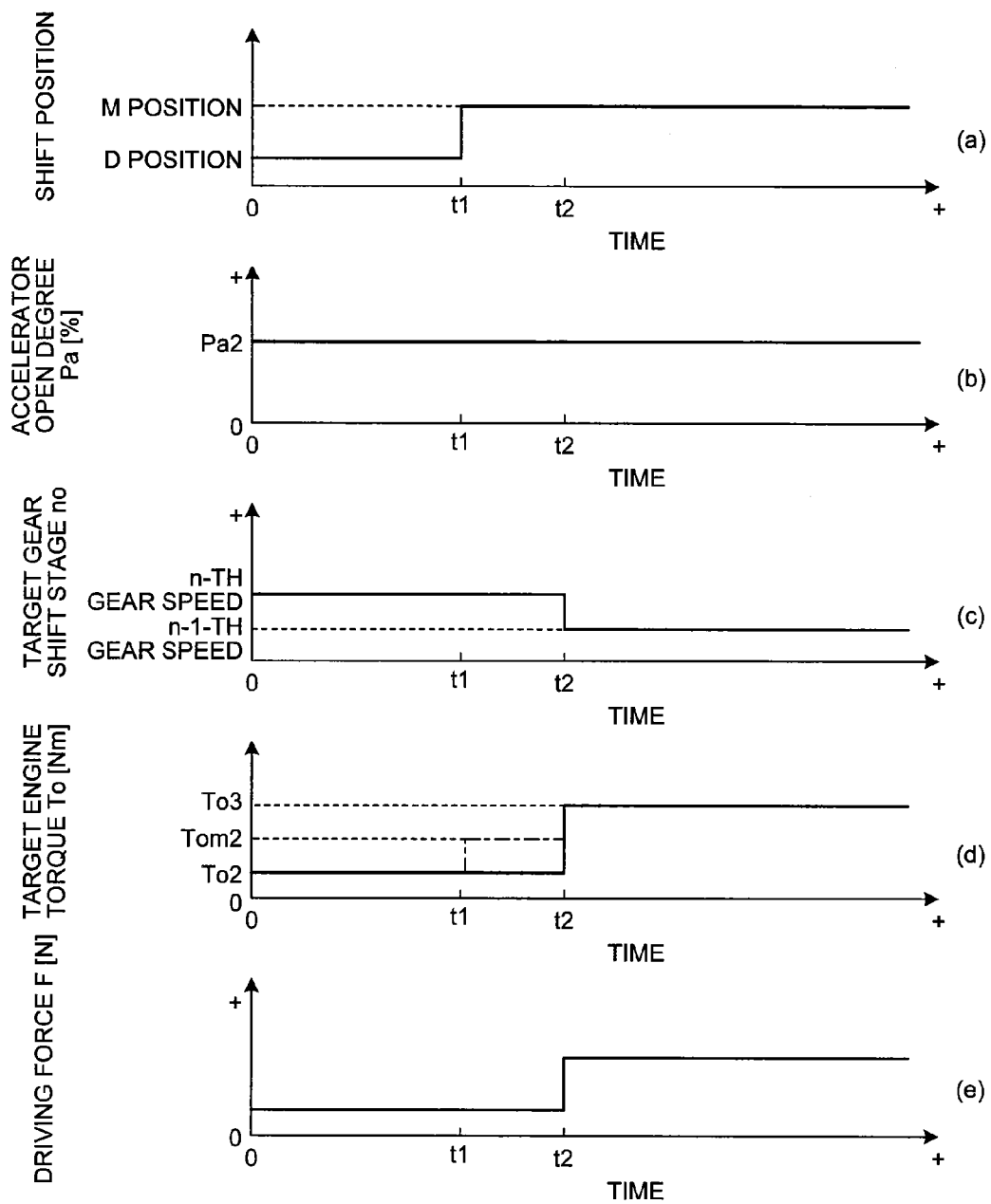
FIG. 5 is an explanatory view of an operation.
Figure 6:
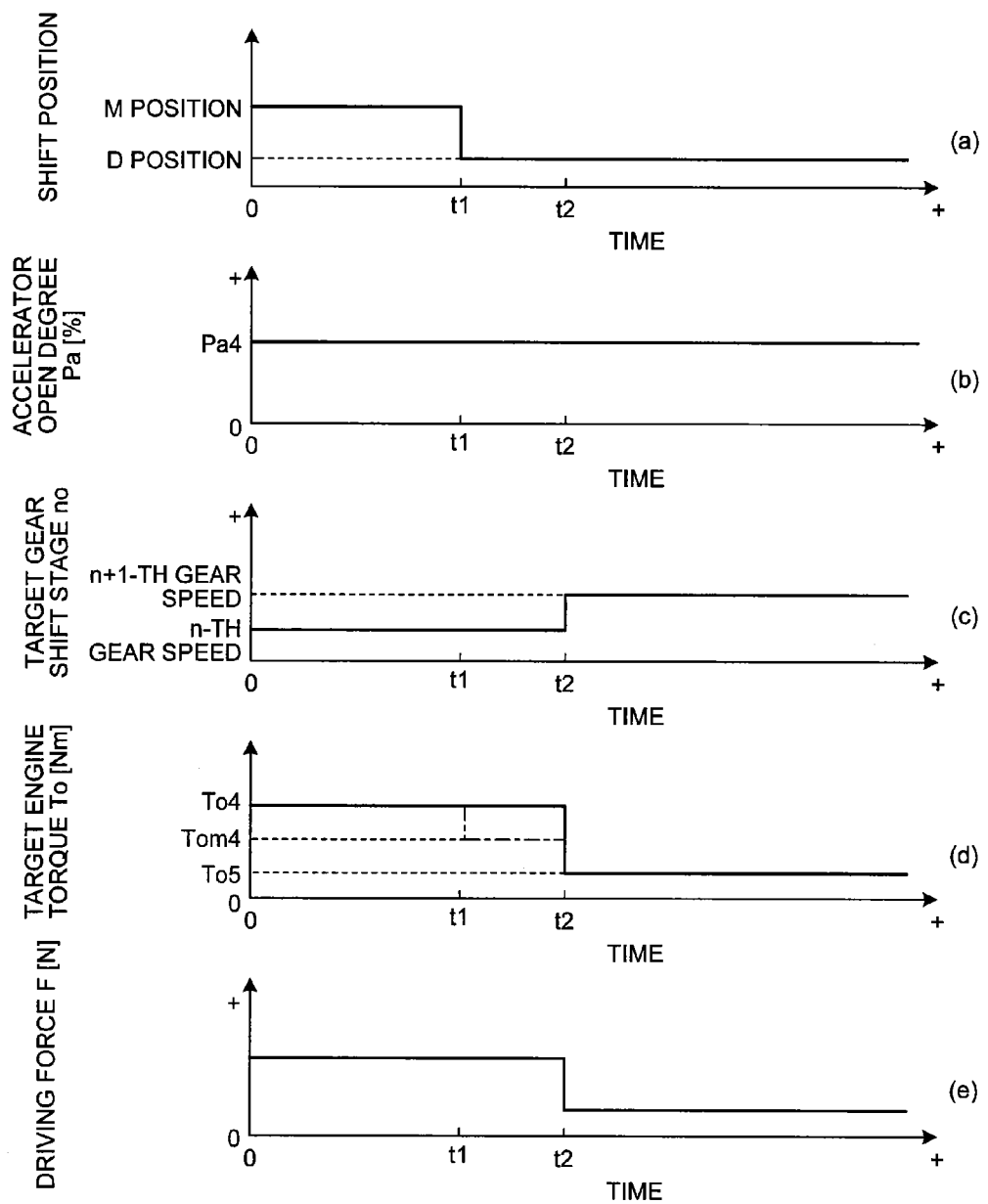
FIG. 6 is an explanatory view of an operation.

FIG. 1 is a view illustrating an example of a schematic configuration of a vehicle control system according to the embodiment. Further, FIG. 2 is a view illustrating an example of a schematic configuration of a shift device. FIG. 3 is a view illustrating a relation between a vehicle speed and acceleration. FIG. 4 is an explanatory view of an operation. FIG. 5 is an explanatory view of an operation. FIG. 6 is an explanatory view of an operation. Note that FIG. 4 to FIG. 6 illustrate respective changes of and a relation between shift positions ((a) of the respective drawings), accelerator open degrees Pa ((b) of the respective drawings), target gear shift stages no ((c) of the respective drawings), target engine torques To ((d) of the respective drawings), and driving forces F ((e) of the respective drawings).

As illustrated in FIG. 1, a vehicle on which a driver gets on (hereinafter, simply called a "vehicle CA") includes at least a vehicle control system 1. The vehicle control system 1 is configured including an accelerator sensor 2, a vehicle speed sensor 3, a shift device 4, an engine 5, a transmission device (hereinafter, simply called "T/M") 6 having an automatic transmission 61, and an ECU 7. In the vehicle control system 1, basically, a control amount based on a request value and a gear shift instruction are determined in the ECU 7 using an accelerator operation amount output from the accelerator sensor 2, a vehicle speed v output from the vehicle speed sensor 3, and an operation state of a shift lever 43 to be described later of the shift device 4 operated by the driver as input values. The vehicle control system 1 controls the engine 5 and the automatic transmission 61 based on the determined control amount and the gear shift instruction and generates acceleration G [m/s$^2$] in response to the request value to the vehicle CA. That is, the vehicle control system 1 performs request value demand control.

The accelerator sensor 2 detects an accelerator operation amount in response to an operation of an accelerator by the driver. In the embodiment, the accelerator sensor 2 detects an accelerator open degree Pa [%] in response to an operation of a not illustrated accelerator pedal operated by the driver. The accelerator sensor 2 is connected to the ECU 7, a signal according to the accelerator open degree Pa is output to the ECU 7, and the accelerator open degree Pa is obtained by the ECU 7 as an input value. The obtained accelerator open degree Pa is used when a target driving force Fo is determined.

The vehicle speed sensor 3 detects the vehicle speed v of the vehicle CA. The vehicle speed sensor 3 is connected to the ECU 7, a signal according to the vehicle speed v is output to the ECU 7, and the vehicle speed v is obtained by the ECU 7 as an input value. The obtained vehicle speed v is used when the target driving force Fo is determined. Here, the vehicle speed sensor 3 is not limited to wheel speed sensors attached to respective wheels of the vehicle CA, sensors for detecting numbers of revolutions of rotary members in a path from the engine 5 to not illustrated drive wheels, and the like and may be a sensor represented by GPS for detecting position data of the vehicle CA, and the like. In the case, the ECU 7 calculates the vehicle speed v based on the output position data.

The shift device 4 is a gear shift operation device and a control switching instructing device. The shift device 4 instructs the automatic transmission 61 to shift a gear between gear shift stages (fixed gear shift ratios) in response to an operation of the driver. Further, the shift device 4 instructs to switch control between automatic gear shift control and manual gear shift control by the ECU 7 to be described later in response to an operation of the driver. As illustrated in FIGS. 1 and 2, the shift device 4 is configured including a first lever path 41, a second lever path 42, the shift lever 43, a lever position sensor 44, an M position switch 45, an up-shift switch 46, and a down-shift switch 47. The shift device 4 is disposed in the vicinity of a driver's seat of the vehicle CA, and the shift lever 43 is moved by the driver along a shift pattern composed of the first lever path 41 and the second lever path 42.

The first lever path 41 is provided with, for example, four lever positions i.e., a P (parking) position, an R (reverse) position, an N (neutral) position, and a D (drive) position.

Further, the second lever path 42 is formed so as to intersect the first lever path 41 at an end thereof at an approximately right angle and is provided with the M (manual) position which is a lever position formed at the position intersecting the first lever path 41 and a plus (up-shift) region and a minus (down-shift) region formed on both ends across the M position.

The shift lever 43 selectively moves to any of the P position, the R position, the N position, the D position, and the M position in response to an operation of the driver. Unless the driver does not perform the operation, the shift lever 43 does not move from a lever position where it is located to other lever position and is kept at the position. Further, the shift lever 43 can move from the M position to the plus region or to the minus region. Here, even if the shift lever 43 moves to the plus region or to the minus region, the shift lever 43 automatically returns to the M position. That is, even if the shift lever 43 moves to the plus region or to the minus region in response to an operation of the driver, the shift lever 43 returns to the M position when the driver removes a hand from the shift lever 43.

The lever position sensor 44 is disposed to the first lever path 41 and detects position information of the shift lever 43 in the first lever path 41 as an operation state of the shift lever 43 by the driver. The lever position sensor 44 detects at which lever position the shift lever 43 is positioned in the first lever path 41 in response to an operation of the driver. The lever position sensor 44 is connected to the ECU 7, and a signal according to a lever position is output to the ECU 7. Here, the ECU 7 controls the engine 5 and the automatic transmission 61 in response to a lever position. Accordingly, when the driver operates the shift lever 43 to the D position, it is determined by the ECU 7 that an instruction for switching to vehicle control corresponding to the D position, in the embodiment, to the automatic gear shift control is made by an intention of the driver.

The M position switch 45 is disposed to the M position of the second lever path 42 and detects that the shift lever 43 is positioned at the M position as an operation state of the shift lever 43 by the driver. The M position switch 45 is turned on when the shift lever 43 is positioned at the M position in response to an operation of the driver. The M position switch 45 is turned off when the shift lever 43 is positioned to the first lever path 41 and keeps a turn-on state as long as the shift lever 43 is positioned to the second lever path 42. The M position switch 45 is connected to the ECU 7, and a signal according to turn-on of the M position switch 45 is output to the ECU 7. Accordingly, when the driver operates the shift lever 43 to the M position, it is determined by the ECU 7 that an instruction for switching to vehicle control corresponding to the M position, in the embodiment, to the manual gear shift control is made by an intention of the driver. That is, the shift device 4 instructs to switch the control between the automatic gear shift control and the manual gear shift control in response to an operation of the driver. Note that a present position is displayed on a not illustrated position indicator which operates in association with the shift device 4 and the driver can recognize the present position.

The up-shift switch 46 is disposed to the plus region and detects that the shift lever 43 has moved from the M position to the plus region as an operation state of the shift lever 43 by the driver. The up-shift switch 46 is turned on when the shift lever 43 moves from the M position to the plus region in response to an operation of the driver. The up-shift switch 46 is turned off when the shift lever 43 returns from the plus region to the M position. The up-shift switch 46 is connected to the ECU 7, and a signal according to turn-on of the up-shift switch 46 is output to the ECU 7. Accordingly, when the driver operates the shift lever 43 so that the shift lever 43 moves from the M position to the plus region, the ECU 7 determines that it is instructed by an intention of the driver to change the gear shift stage of the automatic transmission 61 to an n+1-th gear speed which is higher than the present n-th gear speed in the manual gear shift control, that is, to perform an up-shift.

The down-shift switch 47 is disposed to the minus region and detects that the shift lever 43 has moved from the M position to the minus region as an operation state of the shift lever 43 by the driver. The down-shift switch 47 is turned on when the shift lever 43 moves from the M position to the minus region in response to an operation of the driver. The down-shift switch 47 is turned off when the shift lever 43 returns from the minus region to the M position. The down-shift switch 47 is connected to the ECU 7, and a signal according to turn-on of the down-shift switch 47 is output to the ECU 7. Accordingly, when the driver operates the shift lever 43 so that the shift lever 43 moves from the M position to the minus region, the ECU 7 determines that it is instructed by an intention of the driver to change the gear shift stage of the automatic transmission 61 to an n-1-th gear speed which is lower than the present n-th gear speed in the manual gear shift control, that is, to perform a down-shift. That is, the shift device 4 instructs a gear shift in response to an operation of the driver. Note that a present range is displayed on a not illustrated shift range indicator which operates in association with the shift device 4 and the driver can recognize the present range.

The engine 5 is a power source and is coupled with a not illustrated drive shaft of the vehicle CA. The engine 5 is a heat engine which converts energy of fuel to a mechanical work by combusting the fuel and is a piston reciprocation engine. The engine 5 has a not illustrated fuel injection device, a throttle valve disposed to a not illustrated intake air system of the engine 5, an ignition plug disposed to a not illustrated combustion chamber of the engine 5, various sensors, and the like, and these devices are controlled by the ECU 7. A not illustrated output shaft of the engine 5 is coupled with an input shaft of the T/M 6, a mechanical power output by the engine 5 is transmitted to the drive wheels via the automatic transmission 61 of the T/M 6, a driving force F acts on the drive wheels of the vehicle CA, and the acceleration G is generated to the vehicle CA. An engine torque T generated by the engine 5 is controlled based on the control amount, i.e. in the embodiment, based on a target engine torque To that is determined by the ECU 7. Note that the engine 5 is provided with a not illustrated crank angle sensor for detecting a rotation angle position (hereinafter, described as "crank angle") of the output shaft, and a signal according to the crank angle is output to the ECU 7, and the crank angle is obtained by the ECU 7 as an input value.

The T/M 6 is a power transmission mechanism disposed between the engine 5 and the drive wheels and is configured including a torque converter having a not illustrated lock-up clutch, the automatic transmission 61, various sensors, and the like. These devices are controlled by the ECU 7. A not illustrated output shaft of the T/M 6 is coupled with the drive wheels. The automatic transmission 61 is disposed between the torque converter and the drive shaft. The automatic transmission 61 transmits an engine torque T to the drive wheels as well as converts the engine torque T. The automatic transmission 61 is a transmission having gear shift stages and a gear shift is controlled based on a gear shift instruction. The automatic transmission 61 has gear shift stages of plural gear speeds, for example, from a first gear speed to a sixth gear speed and switches a gear shift ratio to six fixed gear shift ratios corresponding to the respective gear speeds. In the embodiment, the automatic transmission 61 is controlled based on the target gear shift stage no. Here, the target gear shift stage no is determined based on a gear shift instruction at the time of automatic gear shift control or on a gear shift instruction at the time of manual gear shift control. In the automatic transmission 61, when the target gear shift stage no is a gear shift stage higher than the n-th gear speed that is the present gear shift stage by one stage (the target gear shift stage no may be a gear shift stage higher than the present gear shift stage by two stages), the gear shift stage is changed to a higher speed side, that is, a gear is up-shifted and the gear shift stage becomes the n+1-th gear speed, whereas when the target gear shift stage no is a gear shift stage lower than the n-th gear speed that is the present gear shift stage by one stage (the target gear shift stage no may be a gear shift stage lower than the present gear shift stage by two stages), the gear shift stage is changed to a lower speed side, that is, a gear is down-shifted and the gear shift stage becomes the n-1-th gear speed. Since the engine torque T which is transmitted to the automatic transmission 61 is converted in response to a fixed gear shift ratio corresponding to the present gear shift stage and transmitted to the drive wheels, the driving force F changes in response to a gear shift stage and thus the acceleration G changes. Here, a signal according to an n-th gear speed which is the present gear shift stage of the automatic transmission 61 is output to the ECU 7, and an nr-th gear speed as an actual gear shift stage is obtained by the ECU 7 as an input value.

In the embodiment, the ECU 7 is a vehicle control device for performing the automatic gear shift control or the manual gear shift control to the engine 5 and to the automatic transmission 61 of the T/M 6. That is, the ECU 7 has a function as an engine ECU and a function as a transmission ECU. The ECU 7 outputs an injection signal, an ignition signal, an opening degree signal, and the like to the engine 5 based on the determined target engine torque To, and an operation control of the engine 5 such as fuel injection control of a fuel supply amount supplied to the engine 5, a fuel injection timing, and the like, ignition control of the not illustrated ignition plug, opening degree control of the throttle valve, and the like is performed by these output signals. Further, the ECU 7 outputs various hydraulic pressure control signals and the like to the T/M 6 based on the determined target gear shift stage no and performs the gear shift control of the automatic transmission 61 and the like by these output signals. Note that hardware configuration of the ECU 7 is mainly composed of a CPU (Central Processing Unit) for performing a arithmetic process, memory (RAM such as SRAM and the like, ROM (Read Only Memory) such as EEPROM and the like) for storing a program and information, an input/output interface, and the like and is the same as a known ECU mounted on a vehicle, detailed explanation will not be repeated.

Here, when the automatic gear shift control is performed, the ECU 7 determines the target driving force Fo which is a request value corresponding to the acceleration G generated to the vehicle CA based on the accelerator open degree Pa and the vehicle speed v, determines the target engine torque To and the target gear shift stage no based on the target driving force Fo, controls the engine 5 based on the target engine torque To, and controls the gear shift of the automatic transmission 61 based on the target gear shift stage no. In contrast, when the manual gear shift control is performed, the ECU 7 controls the gear shift of the automatic transmission 61 based on the gear shift instruction from the shift device 4 as well as determines the target engine torque To based on the accelerator open degree Pa and vehicle speed v so that a change of the acceleration G generated to the vehicle CA by the gear shift of the automatic transmission 61 becomes larger than that at the time of automatic gear shift control, and controls the engine 5 based on the target engine torque To.

The ECU 7 is configured including a control switching determining unit 71, a target driving force calculating unit 72, a target gear shift stage calculating unit 73, a target engine torque calculating unit 74, and a switching operation control unit 75. The respective units classify the processes (functions) performed by the ECU 7 for the purpose of convenience and the respective units may not be classified as the hardware configuration in the ECU 7.

The control switching determining unit 71 determines whether or not the control is switched between the automatic gear shift control and the manual gear shift control. The control switching determining unit 71 determines that the shift lever 43 is positioned at the D position based on a signal according to a lever position from the lever position sensor 44. Further, the control switching determining unit 71 determines that the shift lever 43 is positioned at the M position based on a signal from the M position switch 45 which illustrates that the M position switch 45 is turned on. Accordingly, the control switching determining unit 71 determines that an instruction for switching the control from the automatic gear shift control to the manual gear shift control or from the manual gear shift control to the automatic gear shift is issued by that the shift lever 43 moves from the D position to the M position or from the M position to the D position.

The target driving force calculating unit 72 calculates the target driving force Fo based on the accelerator open degree Pa and the vehicle speed v and determines the target driving force Fo. The target driving force calculating unit 72 calculates the target driving force Fo based on, for example, the accelerator open degree Pa, the vehicle speed v, and an exponential function based on Weber-Fechner law (hereinafter, simply called "WF exponential function"). The WF exponential function is determined such that when idle is on, that is, when the accelerator open degree Pa is 0%, that is, when the accelerator is turned off (Pa=0), the target driving force Fo is calculated which can apply a previously set minimum acceleration $Ga_{min}$ (for example, a minimum acceleration which can be actually generated to the vehicle CA by the engine 5 and the T/M 6) to the vehicle CA and when the accelerator open degree Pa is 100%, that is, when the accelerator is totally opened (Pa=$Pa_{max}$), the target driving force Fo is calculated which can apply a previously set maximum acceleration $Ga_{max}$ (maximum acceleration determined in consideration of a relation between the accelerator open degree Pa and the acceleration G) to the vehicle CA. Note that the target driving force Fo is determined in consideration of specifications of the vehicle CA, a travel resistance, and the like.

The target gear shift stage calculating unit 73 determines the target gear shift stage no based on the gear shift instruction. When the ECU 7 performs the automatic gear shift control, that is, at the time of automatic gear shift control, the target gear shift stage calculating unit 73 calculates the target gear shift stage no based on the target driving force Fo calculated by the target driving force calculating unit 72 and determines the target gear shift stage no. At the time of automatic gear shift control, the target gear shift stage calculating unit 73 calculates the target gear shift stage no based on, for example, the vehicle speed v and the target driving force Fo. Here, at the time of automatic gear shift control, the target gear shift stage no may be calculated using an expression or using a gear shift map. When the gear shift map is used, to instruct a gear shift, there are formed an up-shift line (when, for example, the vehicle speed v exceeds the up-shift line in an increase direction, the n+1-th gear speed which is higher than the n-th gear speed which is the present gear shift stage by one stage becomes the target gear shift stage no) and a down-shift line (when, for example, the vehicle speed v exceeds the down-shift line in a decrease direction, the n-1 gear speed which is lower than the n-th-th gear speed which is the present gear shift stage by one stage becomes the target gear shift stage no) and the like in response to the vehicle speed v and the target driving force Fo. Here, since a method of determining the target gear shift stage no based on the vehicle speed v and the target driving force Fo is known well, a detailed explanation will not be repeated.

When the ECU 7 performs the manual gear shift control, that is, at the time of manual gear shift control, the target gear shift stage calculating unit 73 calculates the target gear shift stage no based on the gear shift instruction from the shift device 4 which reflects an intention of the driver for performing the gear shift of the automatic transmission 61 and determines the target gear shift stage no. At the time of manual gear shift control, the target gear shift stage calculating unit 73 calculates the target gear shift stage no based on a signal showing that the up-shift switch 46 is turned on or based on a signal showing that the down-shift switch 47 is turned on.

The target engine torque calculating unit 74 determines the target engine torque To which is the control amount based on the accelerator open degree Pa and the vehicle speed v. In the embodiment, at the time of automatic gear shift control, the target engine torque calculating unit 74 calculates the target engine torque To based on the target driving force Fo based on the accelerator open degree Pa and the vehicle speed v calculated by the target driving force calculating unit 72 and determines the target engine torque To. The target engine torque calculating unit 74 calculates the target engine torque To based on, for example, the target driving force Fo and an na-th gear speed which is the actual gear shift stage of the automatic transmission 61 calculated by the target gear shift stage calculating unit 73 at the time of automatic gear shift control. At the time of automatic gear shift control, the target engine torque calculating unit 74 calculates the target engine torque To so that the target driving force Fo can be generated at the na-th gear speed which is the actual gear shift stage of the automatic transmission 61. Note that the ECU 7 controls the engine 5 so that the engine torque T generated by the engine 5 becomes the target engine torque To.

At the time of manual gear shift control, the target engine torque calculating unit 74 determines the target engine torque To which is the control amount based on the accelerator open degree Pa and the vehicle speed v. In the embodiment, at the time of manual gear shift control, the target engine torque calculating unit 74 calculates the target engine torque To based on the target driving force Fo based on the accelerator open degree Pa and the vehicle speed v so that the change of the acceleration G generated to the vehicle CA by the gear shift of the automatic transmission 61 becomes larger than that at the time of automatic gear shift control and determines the target engine torque To. The target engine torque calculating unit 74 calculates the target engine torque To based on, for example, the target driving force Fo and the nr-th gear speed which is the actual gear shift stage of the automatic transmission 61 calculated by the target gear shift stage calculating unit 73 at the time of manual gear shift control. The target engine torque To at the time of manual gear shift control is calculated so that a difference Fa−Fb between a driving force Fa which acts on the vehicle CA after the gear shift of the automatic transmission 61 and a driving force Fb before the gear shift of the automatic transmission 61 at the time of manual gear shift control becomes larger than a difference Fc−Fd between a driving force Fc after the gear shift and a driving force Fd before the gear shift at the time of automatic gear shift control. At the time of manual gear shift control, the target engine torque calculating unit 74 calculates the target engine torque To so that a driving force F in a state, for example, that the accelerator open degree Pa and the vehicle speed v are the same becomes small when a gear shift stage changes from the n-th gear speed to the n+1-th gear speed after the up-shift and becomes large when the gear shift stage changes from the n-th gear speed to the n-1-th gear speed after the down-shift. That is, the target engine torque To at the time of manual gear shift control is calculated so that the acceleration G in the state that the accelerator open degree Pa and the vehicle speed v are the same becomes small when the gear shift stage changes from the n-th gear speed to the n+l-th gear speed after the up-shift and becomes large when the gear shift stage changes from the n-th gear speed the n-1-th gear speed after the down-shift. Specifically, the target engine torque calculating unit 74 calculates the target engine torque To so that maximum acceleration $Gm_{max}$ which is the acceleration G when the accelerator is totally opened is made different at each gear shift stage. Note that the target engine torque calculating unit 74 calculates the target engine torque To so that a minimum acceleration $Gm_{min}$ which is the acceleration G when the accelerator is totally opened becomes minimum acceleration which can be actually generated to the vehicle CA by the engine 5 and the T/M 6. The target engine torque calculating unit 74 corrects, for example, the target driving force Fo calculated at the time of manual gear shift control or the target engine torque To calculated based on the target driving force Fo so that a change of the acceleration G generated to the vehicle CA by a gear shift in response to the nr-th gear speed which is the actual gear shift stage becomes larger than that at the time of automatic gear shift control.

At the time of manual gear shift control, the change of the acceleration G generated to the vehicle CA by the gear shift of the automatic transmission 61 becomes larger than that at the time of automatic gear shift control. As illustrated in FIG. 3, in the embodiment, the maximum acceleration $Ga_{max}$ at the time of automatic gear shift control does not change regardless of the gear shift of the automatic transmission 61. In contrast, the maximum acceleration $Gm_{max}$ at the time of manual gear shift control changes by the gear shift of the automatic transmission 61. Here, the acceleration G generated to the vehicle CA changes from the minimum accelerations $Ga_{min}$, $Gm_{min}$ to maximum accelerations $Ga_{max}$, $Gm_{max}$ between when the accelerator is totally closed and when the accelerator is totally opened. Accordingly, a width of the acceleration G corresponding to an accelerator operation of the driver at the time of automatic gear shift control does not change at an optional vehicle speed v (La illustrated in the drawing). In contrast, a width of the acceleration G corresponding to an accelerator operation of the driver at the time of manual gear shift control changes in response to a gear shift stage at an optional vehicle speed v ($Lm_n$, $Lm_{n-1}$ illustrated in the drawing). That is, at the time of manual gear shift control, the acceleration G generated to the vehicle CA changes at each gear shift stage in the state that the accelerator open degree Pa and the vehicle speed v are the same. When the same control as that the automatic gear shift control is performed also in the manual gear shift control, the change of the acceleration G generated to the vehicle CA by the gear shift of the automatic transmission 61 becomes the same in the manual gear shift control and in the automatic gear shift control. However, as described above, at the time of manual gear shift control, since a manner of generation of the acceleration G to the accelerator operation of the driver is different at each gear shift stage in comparison with the time of automatic gear shift control, controllability, in particular, minute controllability can be improved and thus operability can be improved.

After a control switching instruction is issued, the switching operation control unit 75 controls a switching operation for actually switching control. After the driver issues control switching instruction based on a signal according to a lever position or a signal according to turn-on of the M position switch 45 is issued, the switching operation control unit 75 controls the switching operation which is an operation for switching the control of the engine 5 and the automatic transmission 61 to any of the automatic gear shift control or the manual gear shift control or from the manual gear shift control to the automatic gear shift control.

The switching operation control unit 75 changes the switching operation in response to an operation of the accelerator. The switching operation changes the target engine torque To between a pre-switching control amount and a post-switching control amount in response to the operation of the accelerator. Here, the pre-switching control amount is a control amount at the time of control before the control switching instruction is issued and, in the embodiment, is pre-switching torque Toa which is the target engine torque To that is determined in the control (the automatic gear shift control or the manual gear shift control) before the control is switched in response to the control switching instruction. Further, the post-switching control amount is a control amount at the time of control after the control switching instruction is issued and, in the embodiment, is post-switching torque Tob which is the target engine torque To that is determined in the control (the manual gear shift control when the automatic gear shift control is employed before the control is switching, and the automatic gear shift control when the manual gear shift control is employed before the control is switched) after the control is switched in response to the control switching instruction.

In the embodiment, the switching operation control unit 75 calculates the target engine torque To during the switching operation. The target engine torque To during the switching operation changes from the pre-switching torque Toa to the post-switching torque Tob in response to the accelerator operation in torque, that is, in control amount. The switching operation control unit 75 performs the torque change from the pre-switching torque Toa to the post-switching torque Tob more gently when the accelerator is turned on than when the accelerator is turned off.

As illustrated in FIG. 4, when the accelerator is turned on, the switching operation control unit 75 performs the switching operation for changing torque from pre-switching torque To1 (=Toa) when the accelerator open degree Pa1 at the time of instruction is employed at the time of control before the control is switched to post-switching torque Tox (=Tob) when a predetermined accelerator open degree Pax at the time of instruction is employed at the time of control after the control is switched during the time in which the accelerator open degree Pa changes from the accelerator open degree Pa1 at the time of instruction which is the accelerator open degree Pa when at the control switching instruction is issued to the predetermined accelerator open degree Pax. That is, when the accelerator is turned on, the switching operation control unit 75 performs the switching operation while the accelerator open degree Pa changes. The switching operation control unit 75 calculates the target engine torque To during the switching operation based on, for example, the present accelerator open degree Pa, the accelerator open degree Pa1 at the time of instruction, the predetermined accelerator open degree Pax, the pre-switching torque To1, the post-switching torque Tox, and the following expression (1) and controls the engine 5 based on the calculated target engine torque To. Here, the predetermined accelerator open degree Pax is determined based on the accelerator open degree Pa1 at the time of instruction and can be set to any of a plus value and a minus value because there are a case that the accelerator open degree Pa is increased and a case that the accelerator open degree Pa is decreased depending on the accelerator operation by the driver.

$$To=(Tox-To1)\times((Pa-Pa1)/Pax)+To1 \quad (1)$$

As illustrated in for example, FIG. 4, when the accelerator is in a turn-on state and the control is switched from the automatic gear shift control to the manual gear shift control, a control switching instruction for switching the control from the automatic gear shift control to the manual gear shift control is issued from the shift device 4 when the shift lever 43 moves from the D position to the M position (t1 in FIG. 4), and the switching operation control unit 75 starts the switching operation. In the switching operation, the control is not switched from the automatic gear shift control to the manual gear shift control just after the control switching instruction is issued, and when the accelerator open degree Pa1 at the time of instruction is employed at the time of the automatic gear shift control, the pre-switching torque To1 is kept. Here, unless the switching operation is performed, the control is switched from the automatic gear shift control to the manual gear shift control just after the control switching instruction is issued, and the target engine torque To changes from the pre-switching torque To1 to virtual torque Tom1 when the accelerator open degree Pa1 at the time of instruction is employed at the time of manual gear shift control (two-dot chain line in FIG. 4). Accordingly, when the control is switched from the automatic gear shift control to the manual gear shift control just after the control switching instruction is issued, since the driving force F changes in response to a change of the target engine torque To, there is a possibility that a shock is generated to the vehicle CA and an uncomfortable feeling is applied to the driver regardless that the accelerator open degree Pa is constant and the automatic transmission 61 does not perform a gear shift. However, as described above, since the pre-switching torque To1 is kept just after the control switching instruction is issued, it can be suppressed to apply the uncomfortable feeling to the driver. Note that when the control is switched from the automatic gear shift control to the manual gear shift control, the gear shift of the automatic transmission 61 can be executed based on the gear shift instruction in the manual gear shift control just after the control switching instruction is issued.

When the accelerator open degree Pa changes from the accelerator open degree Pa1 at the time of instruction in response to the accelerator operation by the driver (t2 of FIG.

4), the switching operation control unit 75 controls the engine 5 based on the target engine torque To during the switching operation until the change becomes the predetermined accelerator open degree Pax (t3 of FIG. 4). When the accelerator open degree Pa becomes the predetermined accelerator open degree Pax, the switching operation control unit 75 finishes the switching operation, the control is switched from the automatic gear shift control to the manual gear shift control, and thereafter the manual gear shift control is performed. Accordingly, when, for example, the accelerator open degree Pa more increases from the predetermined accelerator open degree Pax, the engine 5 is controlled based on the target engine torque To when the accelerator open degree Pa is employed at the time of manual gear shift control. As described above, the switching operation control unit 75 gradually changes the target engine torque To from the pre-switching torque to the post-switching torque while the accelerator open degree Pa changes, that is, while the driving force F changes. Accordingly, since the control can be switched while the acceleration G generated in the vehicle CA changes, a shock and the like caused by switching the control can be suppressed from being generated in a state that the accelerator open degree Pa does not change, that is, in a state that no step is generated to the driving force F to the driver, and thereby it can be suppressed to apply the uncomfortable feeling to the driver. Note that the switching operation control unit 75 performs the same switching operation as that described above even when the control is switched from the manual gear shift control to the automatic gear shift control the.

When the accelerator is turned off at the time of the control switching instruction is issued, that is, when the accelerator open degree Pa is 0%, the switching operation control unit 75 performs the switching operation for switching the target engine torque To the post-switching torque Tob just after the control switching instruction is issued. That is, when the accelerator is turned off at the time the control switching instruction is issued, the switching operation control unit 75 switches the control at one based on the control switching instruction. When, for example, the control is switched from the manual gear shift control to the automatic gear shift control, if the accelerator is turned off at the time the control switching instruction is issued, the switching operation is finished just after the control switching instruction is issued, the target engine torque To, when the accelerator open degree Pa at the time the control switching instruction is issued is employed at the time of manual gear shift control, is calculated, and the engine 5 is controlled based on the calculated target engine torque To. In contrast, when the control is switched from the automatic gear shift control to the manual gear shift control, if the accelerator is turned off at the time the control switching instruction is issued, the switching operation is finished just after the control switching instruction is issued, the target engine torque To, when the accelerator open degree Pa at the time the control switching instruction is issued is employed at the time of automatic gear shift control, is calculated, and the engine 5 is controlled based on the calculated target engine torque To. Accordingly, just after the control switching instruction is issued, the target engine torque To changes from the pre-switching torque Toa when the accelerator is in a turn-off state (Pa=0) in the control before the control is switched to the post-switching torque Tob. When the accelerator is turned off, the driver has an intention that he or she desires to decelerate the vehicle CA by an engine brake. Further, the case that the control switching instruction is issued in the state that the accelerator is in the turn-off state is a case that the driver has an intention that he or she desires to change the acceleration of the vehicle CA by changing the engine brake. Accordingly, it positively reflects the intention of the driver that the driving force F is changed by switching the control just after the control switching instruction is issued in the state that the accelerator is in the turn-off state. That is, when the driver desires to change the driving force F, since the driving force F can be changed by the intention of the driver, it can be suppressed to apply the uncomfortable feeling to the driver.

As illustrated in FIGS. 5 and 6, when the gear shift of the automatic transmission 61 is performed at the time the accelerator is turned on, the switching operation control unit 75 performs the switching operation for changing the target engine torque To to the post-switching torque Tob just after the gear shift. That is, when the accelerator is in a turned on state at the time of control switching instruction and the gear shift of the automatic transmission 61 is performed after the control switching instruction is issued, the switching operation control unit 75 switches control at once based on the control switching instruction.

As illustrated in FIG. 5, when, for example, the accelerator is in the turn-on state and the control is switched from the automatic gear shift control to the manual gear shift control, the control switching instruction for switching the control from the automatic gear shift control to the manual gear shift control is issued from the shift device 4 when the shift lever 43 moves from the D position to the M position (t1 in FIG. 5), and the switching operation control unit 75 starts the switching operation. In the switching operation, the control is not switched from the automatic gear shift control to the manual gear shift control just after the control switching instruction is issued, and the pre-switching torque To2 when the accelerator open degree Pa2 at the time of instruction is employed at the time of automatic gear shift control is kept. As described above, since the target engine torque To does not change from the pre-switching torque To2 to the virtual torque Tom2 (one-dot chain line illustrated in FIG. 5) it can be suppressed to apply the uncomfortable feeling to the driver as described above. When the accelerator open degree Pa is kept to the accelerator open degree Pa2 at the time of instruction and the gear shift stage of the automatic transmission 61 is changed from the n-th gear speed to the n-1-th gear speed based on the gear shift instruction by the operation of the shift lever 43 by the driver, that is, when a shift-down is performed (t2 in FIG. 5), the switching operation control unit 75 switches the control from the automatic gear shift control to the manual gear shift control at once and controls the engine 5 based on target engine torque To3 when the gear shift stage is the n-1-th gear speed and the accelerator open degree Pa2 at the time of instruction is employed at the time of manual gear shift control. In the manual gear shift control, when the gear shift of the automatic transmission 61 is performed by the intention of the driver, the driver has an intention that he or she desires to change the acceleration G by changing the driving force F. Accordingly, when the driver desires to change the driving force F by the gear shift of the automatic transmission 61, since the driving force F can be changed by reflecting the intention of the driver, it can be suppressed to apply the uncomfortable feeling to the driver.

Further, as illustrated in FIG. 6, when the accelerator is in the turn-on state and the control is switched from the manual gear shift control to the automatic gear shift control, the control switching instruction for switching the control from the manual gear shift control to the automatic gear shift control is issued from the shift device 4 when the shift lever 43 moves from the M position to the D position (t1 in FIG. 6), and the switching operation control unit 75 starts the switching operation. In the switching operation, the control is not switched from the manual gear shift control to the automatic gear shift control just after the control switching instruction is issued, and the pre-switching torque To4 when the accelerator open degree Pa4 at the time of instruction is employed at the time of manual gear shift control is kept. As described above, since the target engine torque To does not change from the pre-switching torque To4 to the a virtual torque Tom4 change (one-dot chain line in FIG. 6), it can be suppressed to apply the uncomfortable feeling to the driver as described above. When the accelerator open degree Pa is kept to the accelerator open degree Pa2 at the time of instruction and the gear shift stage of the automatic transmission 61 is changed from the n-th gear speed to the n+1-th gear speed based on the gear shift instruction in the automatic gear shift control, that is when an up-down is performed (t2 in FIG. 6), the switching operation control unit 75 switches the control from the manual gear shift control to the automatic gear shift control at once and controls the engine 5 based on target engine torque To5 when the accelerator open degree Pa2 at the time of instruction is employed at the time of automatic gear shift control. When the control is switched from the manual gear shift control to the automatic gear shift control, since a shock caused by a change of engine torque T generated by switching the control is confused with a shock caused by a gear shift at the time of automatic gear shift control, it can be suppressed to apply the uncomfortable feeling to the driver.

Figure 7:
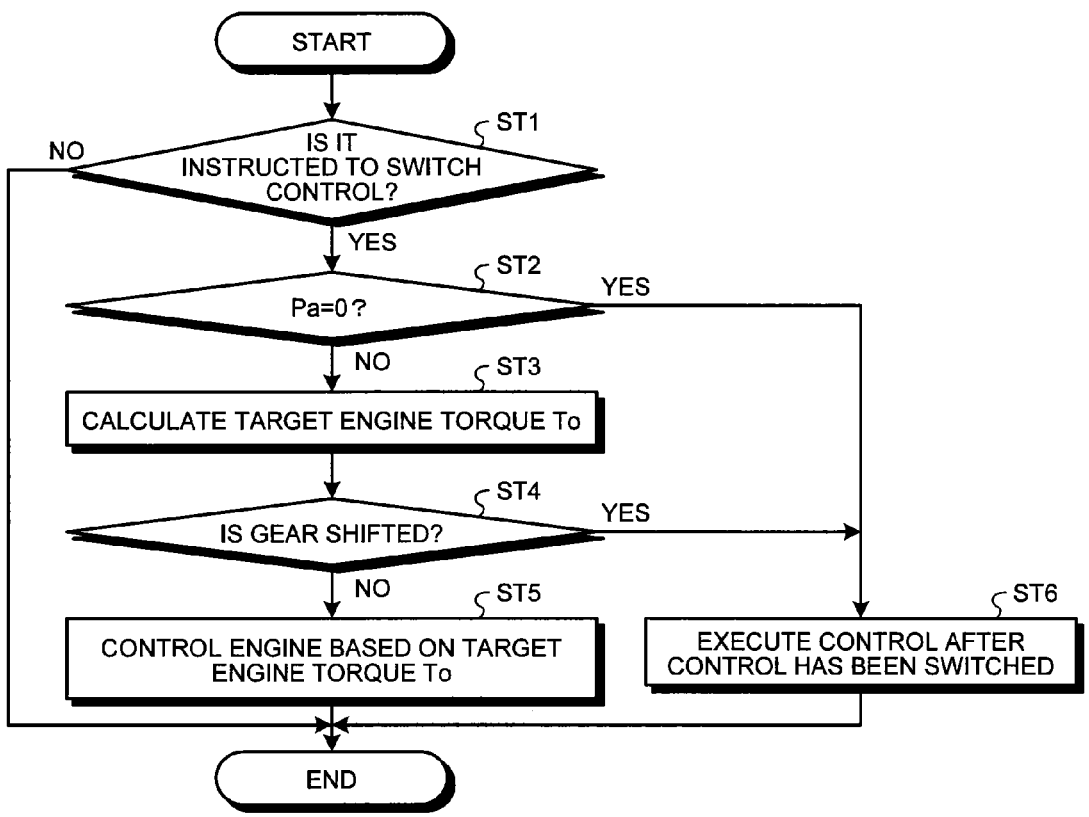
FIG. 7 is a control flowchart illustrating a vehicle control method by the vehicle control system according to the embodiment.

Next, a vehicle control method by the vehicle control system 1 will be explained. Here, a control method of the switching operation will be explained. FIG. 7 is a control flowchart illustrating the vehicle control method by the vehicle control system according to the embodiment. Note that since the method of controlling the engine 5 and the automatic transmission 61 by the automatic gear shift control or the manual gear shift control has been explained above, the method will not be repeated here. The control method of the switching operation is executed at a predetermined control cycle. Further, the control flowchart illustrated in the drawing is an example and a sequence of respective processes is not limited to the flowchart.

First, the control switching determining unit 71 of the ECU 7 determines whether or not a control switching instruction is issued (step ST1). Here, the control switching determining unit 71 determines whether or not a control switching instruction for switching the control to any of the automatic gear shift control or the manual gear shift control is issued.

Next, when the switching operation control unit 75 of the ECU 7 determines that the control switching instruction is issued (step ST1: YES), the switching operation control unit 75 determines whether or not the accelerator open degree Pa is 0 (step ST2). Here, when the switching operation control unit 75 determines that the switching operation is performed, the switching operation control unit 75 determines whether or not the accelerator is turned off when the control switching instruction is issued. Note that when the switching operation control unit 75 determines that the control switching instruction is not issued (step ST1: No), the switching operation control unit 75 finishes the present control cycle and goes to a next control cycle.

Next, when the switching operation control unit 75 determines that the accelerator open degree Pa is not 0 (step ST2: No), the switching operation control unit 75 calculates the target engine torque To during the switching operation (step ST3). Since the calculation method of the target engine torque To during the switching operation has been described above, the calculation method will not be repeated here.

Next, the switching operation control unit 75 determines whether or not the gear shift of the automatic transmission 61 has been performed (Step ST4). Here, the switching operation control unit 75 determines whether or not the gear shift of the automatic transmission 61 has been performed after the control switching instruction is issued based on the gear shift instruction in the manual gear shift control or based on the gear shift instruction in the automatic gear shift control.

Next, when the switching operation control unit 75 determines that the gear shift of the automatic transmission 61 has not been performed (step ST4: No), the switching operation control unit 75 controls the engine 5 based on the calculated target engine torque To during the switching operation (step ST5), finishes the present control cycle, and goes to a next control cycle. Accordingly, a torque change from the pre-switching torque Toa to the post-switching torque Tob is performed while the accelerator open degree Pa changes.

Further, when the switching operation control unit 75 determines that the accelerator open degree Pa is 0 (step ST2: YES) or determines that the gear shift of the automatic transmission 61 has been performed (step ST4: Yes), the switching operation control unit 75 executes the control after the control is switched (step ST6) finishes the present control cycle, and goes to a next control cycle. Accordingly, the control is switched at once just after the gear shift of the automatic transmission 61 is performed.

As described above, in the vehicle control method according to the embodiment, since the target engine torque To is determined so that the change of the acceleration G generated to the vehicle CA by the gear shift of the automatic transmission 61 at the time of manual gear shift control becomes larger than that at the time of automatic gear shift control and the engine 5 is controlled based on the determined target engine torque To, controllability of the vehicle at the time of manual gear shift control can be improved. Further, the switching operation for actually switching the control is changed in response to the accelerator operation after the control switching instruction is issued, it can be suppressed to apply the uncomfortable feeling to the driver.

Note that, in the embodiment, although the target engine torque To in the manual gear shift control is calculated based on the target driving force Fo, the present invention is not limited thereto, and the target engine torque To may be calculated directly based on the accelerator open degree Pa and the vehicle speed v. That is, the target engine torque To at the time of manual gear shift control may be determined by a calculation method of the target engine torque To in a conventional vehicle CA. Note that, in the case, at the time of automatic gear shift control, the target engine torque To is calculated so that the change of the acceleration G generated to the vehicle CA by the gear shift of the automatic transmission 61 becomes smaller than that at the time of manual gear shift control.

Further, in the embodiment, when the control is switched, the gear shift of the automatic transmission 61 may be forcibly performed. As illustrated in, for example, FIG. 4, when the control is switched from the automatic gear shift control to the manual gear shift control in response to the control switching instruction, the up-shift or the down-shift may be forcibly performed (refer to one-dot chain line). Also in the case, when the accelerator is turned on, the switching operation control unit 75 performs the switching operation while the accelerator open degree Pa changes. Accordingly, in the switching operation, the control is not switched from the automatic gear shift control to the manual gear shift control just after the control switching instruction is issued, and the pre-switching torque To1 when the accelerator open degree Pa1 at the time of instruction is employed at the time of automatic gear shift control is kept.

Further, in the embodiment, although the target driving force Fo is employed as the request value corresponding to the acceleration G generated to the vehicle CA, the present invention is not limited thereto and the request value may be a target acceleration GX. In the case, at least at the time of automatic gear shift control, the target engine torque To and the target gear shift stage no are determined based on the target acceleration GX.

INDUSTRIAL APPLICABILITY

As described above, the vehicle control system and the vehicle control method are useful to a vehicle control system and a vehicle control method which determine a request value corresponding to acceleration acting on a vehicle based on an accelerator operation amount in response to an accelerator operation performed by a driver and based on a vehicle speed of a vehicle and in particular suitable for sufficiently realizing acceleration according to a feeling of a driver by determining target acceleration optimum to an accelerator operation amount of the driver.

REFERENCE SIGNS LIST

1 Vehicle Control System
2 Accelerator Sensor
3 Vehicle Speed Sensor
4 Shift Device
41 First Lever Path
42 Second Lever Path
43 Shift Lever
44 Lever Position Sensor
45 M Position Switch
46 Up-Shift Switch
47 Down-Shift Switch
5 Engine
6 Transmission (T/M)
7 Ecu
71 Control Switching Determining Unit
72 Target Driving Force Calculating Unit
73 Target Gear Shift Stage Calculating Unit
74 Target Engine Torque Calculating Unit
75 Switching Operation Control Unit

The invention claimed is:

1. A vehicle control system comprising:
a power source coupled with drive wheels of a vehicle and controlled based on a control amount;
an automatic transmission disposed between the power source and the drive wheels and a gear shift of which is controlled based on a gear shift instruction;
a gear shift operation device configured to instruct a gear shift in response to an operation of a driver;
a vehicle control device configured to perform any control of automatic gear shift control that controls the power source and the automatic transmission, respectively based on the control amount which is determined based on a request value corresponding to acceleration determined based on an accelerator operation amount in response to an accelerator operation performed by the driver and a vehicle speed and based on the gear shift instruction, and manual gear shift control that controls the automatic transmission based on the gear shift instruction from the gear shift operation device as well as controls the power source based on the control amount which is determined based on the accelerator operation amount and the vehicle speed so that a change of acceleration generated to the vehicle by the gear shift becomes larger than that at the time of automatic gear shift control; and
a control switching instructing device configured to instruct to switch control between the automatic gear shift control and the manual gear shift control in response to an operation of the driver, wherein
after the control switching instruction is issued, the vehicle control device changes a switching operation that actually switches the control in response to the accelerator operation, and
the switching operation includes changing the control amount from a pre-switching control amount which is the control amount at the time of control before the control is switched to a post-switching control amount which is the control amount at the time of control after the control is switched, and the control amount is changed more gently when the accelerator is turned on than when the accelerator is turned off.

2. The vehicle control system according to claim 1, wherein the switching operation when the accelerator is turned on is performed while the accelerator operation amount changes.

3. The vehicle control system according to claim 2, wherein when the accelerator is turned off at the time it is instructed to switch the control, the switching operation makes the control amount to the post-switching control amount just after it is instructed to switch the control.

4. The vehicle control system according to claim 1, wherein when the accelerator is turned off at the time it is instructed to switch the control, the switching operation makes the control amount to the post-switching control amount just after it is instructed to switch the control.

5. The vehicle control system according to claim 1, wherein when a gear shift of the automatic transmission is performed at the time the accelerator is turned on, the switching operation makes the control amount to the post-switching control amount just after the gear shift.

6. A vehicle control method of controlling a power source and an automatic transmission by any of automatic gear shift control that controls the power source coupled with drive wheels of a vehicle based on a control amount which is determined based on a request value corresponding to acceleration determined based on an accelerator operation amount in response to an accelerator operation performed by a driver and based on a vehicle speed of the vehicle and controls a gear shift of the automatic transmission disposed between the power source and the drive wheels based on a gear shift instruction determined based on the request value, and manual gear shift control that controls a gear shift of the automatic transmission based on the gear shift instruction from the gear shift operation device which instructs a gear shift to the automatic transmission in response to an operation of the driver as well as controls the power source based on the control amount which is determined based on the accelerator operation amount and the vehicle speed so that a change of acceleration generated to the vehicle by the gear shift becomes larger than that at the time of automatic gear shift control, wherein
after it is instructed to switch control between the automatic gear shift control and the manual gear shift control based on an operation of the driver, a switching operation that actually switches the control is changed in response to the accelerator operation, and
the switching operation includes changing the control amount from a pre-switching control amount which is the control amount at the time of control before the control is switched to a post-switching control amount which is the control amount at the time of control after the control is switched, and the control amount is changed more gently when the accelerator is turned on than when the accelerator is turned off.

* * * * *